Oct. 29, 1946.  J. R. GUILDFORD  2,410,027
NONSLIP JOINT SPLIT RING UNION DEVICE
Filed March 20, 1944
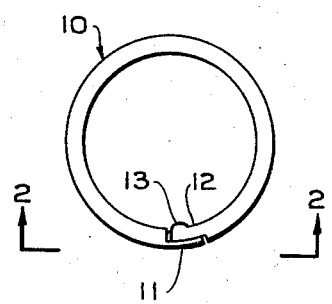
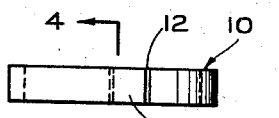
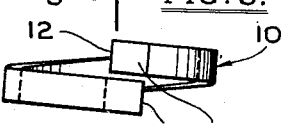
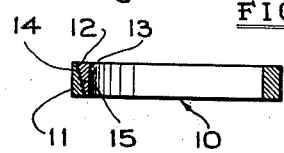
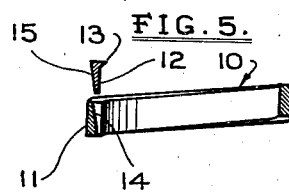
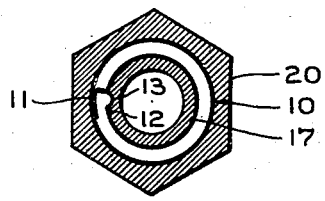
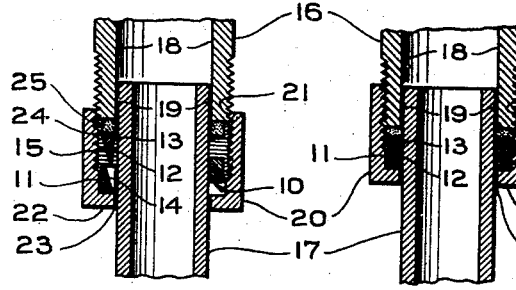
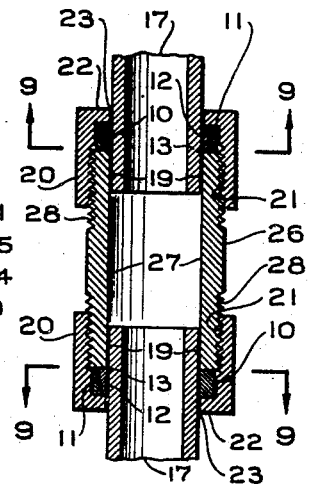
INVENTOR.
Joseph R. Guildford.

Patented Oct. 29, 1946

2,410,027

UNITED STATES PATENT OFFICE 2,410,027

NONSLIP JOINT SPLIT RING UNION DEVICE

Joseph R. Guildford, Buffalo, N. Y.

Application March 20, 1944, Serial No. 527,169

6 Claims. (Cl. 285—123)

This invention relates to a device for use in slip joint union connections and has for its primary object to provide means to lock such connections together to prevent them from pulling apart regardless of internal pressures or vibration.

An object of this invention is to provide means for making non-slip joints in union connections without the need of anchoring the plain unthreaded tubing or threaded fitting to which the unthreaded tubing is to be connected.

Another object of this invention is to provide means of making tight non-slip joints between plain unthreaded tubing and threaded pipe, valves, fittings or the like, thereby eliminating the possibility of such joints from slipping apart due to expansion and contraction.

This invention may be used for making non-slip joints between plain unthreaded tubing manufactured from all types of metals or plastics and threaded fittings, valves, pipe or the like.

Other objects and advantages of the invention will be apparent from the following description and accompanying drawing wherein—

Figure 1 is a plan view of the split ring when compressed into non-slip position.

Figure 2 is a vertical elevation of Figure 1 on line 2—2.

Figure 3 is a vertical elevation of the split ring in open position.

Figure 4 is a vertical sectional elevation of Figure 2 on line 4—4.

Figure 5 is a vertical sectional elevation of Figure 3 on line 5—5.

Figure 6 is a vertical sectional elevation of a union connection with an annular compressible packing and friction ring showing the split ring in open position before being compressed.

Figure 7 is a vertical sectional elevation of a union connection with an annular compressible packing and friction ring showing the split ring in compressed position wherein the tooth of the split ring is shown forced into the wall of and gripping the tubing.

Figure 8 is a vertical sectional elevation of a tube connector union device showing two split rings in compressed position gripping the tubing with the tooth portion of each ring.

Figure 9 is a cross-sectional view of Figure 8 on lines 9—9.

Referring to the drawing:

The numeral 10 represents a ring split in part axially to provide abutting split portions 11 and 12. A tooth 13 is provided integrally on the split portion 12 extending within the inner circumference of the ring 10. The inner side of the split portion 11 is formed at an angle a few degrees off of vertical at 14. The outer side of the split portion 12 is formed at an angle at 15 parallel to the abutting angle at 14 providing interengaging surfaces between the split portions 11 and 12.

The numeral 16 indicates a cutaway sectional portion of a male threaded fitting, valve, pipe, or the like, to which plain unthreaded tubing 17 is to be connected. The interior portion of 16 is adapted at 18 to slidably receive the plain end 19 of the tubing 17. The numeral 20 designates a slip joint nut threaded interiorly at 21 to threadedly fit the male thread on 16. On one end of the nut 20 an inverted flange 22 is provided. This flange 22 is adapted at 23 to slidably fit the tubing 17. The numeral 24 designates an ordinary annular friction ring and 25 designates a compressible annular packing.

The inner circumference of the ring 10 is adapted to fit the exterior circumference of the tubing 17. The outer circumference of the ring 10 is adapted to fit within the inner circumference of the nut 20.

The angular cuneated portions 14 and 15 of the split ring 10 are provided so that when the ring 10 is compressed into the position shown in Figure 7 the tooth 13 is projected into the wall of the tubing 17 thereby gripping the tubing in such manner as to prevent the tubing from slipping in any direction.

In Figure 6 it will be noted that the split ring 10 in section is shown open wherein the top of the tooth 13 and top of the split ring portion 12 abuts the friction ring 24. As the nut 20 is screwed onto the threaded fitting 16 the split ring portion 11 of the ring 10 is forced toward the split ring portion 12. As the portion 11 with its angular cuneal portion 14 continues to be forced onto the angular cuneal portion 15 of 12 the tooth 13 starts to bite into the exterior wall of the tubing 17. When the split ring 10 has become completely compressed shut and the tooth 13 has entered the outer portion of the wall of the tubing 17 the packing 25 is compressed making a tight leakless joint.

The numeral 26 comprises a nipple or sleeve in which the interior wall 27 is adapted to slidably fit the tubing 17. The ends of the nipple 26 are provided with male threads 28.

The method of compressing the split rings 10 against the ends of the nipple 26 are the same as described above.

In Figure 8 friction rings 24 and packings 25 are not shown or required as the illustration is intended to show how plain tubing such as electrical conduit or the like may be connected and held rigidly in place without the danger of being pulled apart.

It will be obvious that when the split ring is compressed in a union connection and the tooth of the split ring has simultaneously bitten into the tubing wall it would be next to impossible for the tubing to slip regardless of pressure or vibration with the result that a joint would be safe from rupture and possible disastrous leaks.

While I have shown and described non-slip joints in which the split ring device is compressed with threaded slip joint nuts it is to be understood that these split ring devices may be used in joints where the said split ring may be compressed with slip flanges adapted to be tightened with bolts and nuts externally of the tubing to be connected.

It is believed that the many advantages of this invention will be readily understood, and although the preferred embodiment of said invention is as illustrated and described, it is to be understood that changes in the details of construction may be resorted to which will fall within the scope of the invention as claimed.

What is claimed is:

1. A non-slip joint union device for gripping plain tubing in a union connection comprising an annular ring split in part axially and provided with a tooth for projecting into the exterior wall of said tubing said tooth extending interiorly of the inner circumference of said annular said slit portion of the annular ring being provided with cuneated abutting portions for slidable engagement and adapted to urge said tooth into the said tubing when said cuneated slidable engagement portions are compressed together within said union connection.

2. A non-slip joint union device for gripping plain unthreaded tubing in a union connection having a slip joint nut said non-slip device comprising a split ring having a gripping portion for biting into the exterior wall of said tubing said split ring adapted interiorly to fit the exterior of said tubing and adapted exteriorly to fit within the interior of said nut said gripping portion comprising a tooth extending inwardly of said ring said split portion of said ring being provided with axially extending wedge-shaped abutting portions having inter-engaging surfaces for slidable engagement and adapted to urge said gripping portion to bite into the exterior wall of said tubing when the wedge-shaped inter-engaging surfaces of said split ring are compressed by said slip joint nut thereby preventing said tubing from slipping out of said union connection.

3. In a slip joint union having a compressible annular and compressing means for connecting plain unthreaded tubing with threaded tubing, a non-slip device for anchoring said plain tubing within said union comprising a ring split in part axially and adapted interiorly to fit the exterior of said unthreaded tubing and adapted exteriorly to fit the interior of said compressing means a tooth for anchoring said unthreaded tubing said tooth extending interiorly of said ring said split portion of the ring being provided with axially inclined abutting surfaces for slidable engagement and adapted to urge said tooth into the exterior wall of said unthreaded tubing as the said axially inclined abutting surfaces of said ring are compressed together by said compression means thereby preventing said unthreaded tubing from slipping in either direction within said threaded tubing.

4. In a slip joint union employing compression means for connecting unthreaded tubing with tubing of increased dimensions adapted interiorly to slidably receive the unthreaded tubing, a device for converting said slip joint union into a non-slip joint union comprising a ring split in part axially and provided with a tooth said tooth projecting inwardly of said ring said device adapted to slidably fit the unthreaded tubing and slidably fit said compression means said split portion of the ring being provided with axially inclined abutting wedge surfaces for slidable engagement and adapted to force said tooth into the wall of said unthreaded tubing when said slidable engaging wedge surfaces are compressed together by said compression means.

5. In a telescoping tubular connection provided with compression means, a non-slip device to prevent telescopic movement of said tubular connection comprising a ring split open axially, and provided with axially extending inter-engaging wedge surfaces and gripping means said gripping means provided integrally with and extending within the inner circumference of said ring said device adapted to slidably fit said telescopic tube in split open position and grip said telescopic tube with said gripping means when said axially extending wedge surfaces of said ring are compressed together into closed position by said compression means.

6. In a telescoping tubular connection provided with compression means, a non-slip device to prevent telescopic movement of said tubular connection comprising a ring axially split open in part and provided with gripping means, said gripping means consisting of a toothlike portion provided integrally with and extending within the inner circumference of said ring, said split open portion of the ring being provided with axially extending inter-engaging wedge surfaces for slidable engagement, said non-slip device adapted to slidably fit said telescopic tube in split open position and grip said telescopic tube with said gripping means as said inter-engaging wedge surfaces are compressed together into closed position by said compression means.

JOSEPH R. GUILDFORD.